United States Patent
Senthil et al.

(10) Patent No.: US 6,865,189 B2
(45) Date of Patent: Mar. 8, 2005

(54) MINIMAL LATENCY SERIAL MEDIA INDEPENDENT INTERFACE TO MEDIA INDEPENDENT INTERFACE CONVERTER

(75) Inventors: Gurumani Senthil, San Jose, CA (US); Vardhaman Veturi, Milpitas, CA (US)

(73) Assignee: LSI Logic Corporation, Milpitas, CA (US)

(*) Notice: Subject to any disclaimer, the term of this patent is extended or adjusted under 35 U.S.C. 154(b) by 923 days.

(21) Appl. No.: 09/815,987

(22) Filed: Mar. 22, 2001

(65) Prior Publication Data

US 2002/0178291 A1 Nov. 28, 2002

(51) Int. Cl.[7] .............. H04J 3/16; H04J 3/22; H04L 7/00
(52) U.S. Cl. ............ 370/466; 370/503; 375/354
(58) Field of Search ............ 370/466, 503; 375/354

(56) References Cited

U.S. PATENT DOCUMENTS

2002/0126684 A1 * 9/2002 Findlater et al. ............ 370/419
2003/0061341 A1 * 3/2003 Loh et al. ............ 709/224
2003/0099253 A1 * 5/2003 Kim ............ 370/462

OTHER PUBLICATIONS

Intel Development Kit Manual, "LXD9785 PQFP Demo Board with FPGA for RMII-to-MII Conversion", Jan. 24, 2002.*

* cited by examiner

Primary Examiner—Dang Ton
Assistant Examiner—Kevin C. Harper
(74) Attorney, Agent, or Firm—Akin, Gump, Strauss, Hauer & Feld, L.L.P.

(57) ABSTRACT

A method for reducing latency in conversions from a SMII (Serial Media Independent Interface) to a MII (Media Independent Interface). The method involves generating receive and transmit clock signals from a physical layer device; generating receive and transmit clock signals at a media access controller; and synchronizing the clock signals at the media access controller and the clock signals at the physical layer device such that MII clocks are generated from the SMII and a synchronization signal of the SMII is always delayed 8 nsec from a positive edge of the MII clock.

8 Claims, 7 Drawing Sheets

MINIMAL LATENCY SERIAL MEDIA INDEPENDENT INTERFACE TO MEDIA INDEPENDENT INTERFACE CONVERTER

AUTHORIZATION PURSUANT TO 37 C.F.R. 1.71(E)

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to networking a computer system, and more particularly to a converter that speeds up conversion of signals between a Serial Media Independent Interface (SMII) and a Media Independent Interface (MII) regardless of a reduction in the number of pins that are available.

2. Description of the Related Art

Many computer systems today are utilized in a network configuration where each network computer can transmit data to other computers on the same network. Various systems and related protocols have been developed over the years to implement such networks, such as Ethernet, Token Ring, and ATM. Depending upon which network protocol is utilized, certain requirements must be met, such as the type of hardware used and particular data characteristics.

The Ethernet network is a well-known communication network and is considered by many to be the most popular LAN system in use today. Since the beginning of the Ethernet protocol in the early 1970s, computer networking companies and engineering professionals have continually strove to improve Ethernet product versatility, reliability and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well-known LAN standard called the "IEEE 802.3 Standard".

In general, the Ethernet network provides for communication of computer data amongst user nodes attached to the network. A 10-Base Ethernet system operates to transmit data packets from a source address to a destination address at a speed of 10 Mbps (megabits per second). A faster system is the 100-Base Ethernet system which similarly operates to transmit data packets from a source address to a destination address but at a speed of 100 Mbps. It should be noted, however, that the traditional Ethernet network is a bus type topology. As such, the Ethernet network has been traditionally confined to LAN applications. For example, the 10/100-Base Ethernet bus is typically limited to approximately 100 feet from node to node, such as for use in small buildings and the like.

Efforts to improve the networking of digital computers and the transmission of digital data have been the object of significant research and development in the past. Networking allows computers to share resources, access huge stores of information, communicate via e-mail, share data, and transfer files. Networking technology and digital data transmission have been subject to a number of bandwidth and speed limitations.

In the past, networking technology has suffered from limitations on data transmission rates which limit the bandwidth of the system. For example, local area networks (LANs) may be connected with cables that have finite limitations on the amount of data they can pass, and the speed at which it can be done. LANs may be connected to extended wide area networks (WANs) over transmission lines that have bandwidth limitations. When modems are required for communication over conventional telephone lines, severe limitations may be imposed upon data transmission rates.

Currently, there are a wide variety of standard Ethernet compliant products used for receiving, processing, and transmitting data over Ethernet networks. These products include, by way of example, network interface card (NICs), routers, switching hubs, bridges, and repeaters. Until recently, common data transmission speeds over Ethernet networks were 10 Mbps. However, to meet the demand for faster data transmission speeds, the IEEE 802.3 Standards Committee officially introduced another standard—the IEEE 802.3u Standard—for a 100BASE-T system capable of performing data transmission at up to 100 Mbps. When operating with a UTP cable as a transmission medium, these networks are commonly referred to as 10BASE-T and 100BASE-T networks.

Network devices generally adhere to an open systems interconnection (OSI) layered model developed by the International Organization for Standards (ISO) for describing the exchange of information between layers. The OSI layered model is particularly useful for separating the technological functions of each layer, and thereby facilitating the modification or update of a given layer without detrimentally impacting the functions of neighboring layers.

Multiple layers defined in the OSI model are responsible for various functions, including: providing reliable transmission of data over a network; routing data between nodes in a network; initiating, maintaining, and terminating a communication link between users connected to the nodes; performing data transfers within a particular level of service quality; controlling when users are able to transmit and receive data depending on whether the user is capable of full-duplex or half-duplex transmission; translating, converting, compressing, and decompressing data being transmitted across a medium; and providing users with suitable interfaces for accessing and connecting to a network. The lower portion of the OSI model includes a media access control (MAC) layer, which generally schedules and controls the access of data to a physical layer (PHY).

At the lower most portion of the OSI model, the PHY layer is responsible for encoding and decoding data into signals that are transmitted across a particular medium, such as a cable. To enable transmission to a particular medium, the PHY layer also includes a physical connector which is configured and operable to receive the cable. In addition, the cable can take various forms, including that of an unshielded, twisted pair (UTP) cable, which is used for various types of Ethernet transmission, including 10BASE-T and 100BASE-T.

In order for a network to accommodate a number of users efficiently, routing and flow control procedures have to be established. There are many rules that must be followed, and these rules are typically referred to as protocols. Packet-switched networks subdivide digital data messages into packets. The digital data is then transmitted packet by packet. Each packet must contain not only the information bits comprising the digital data that is to be transmitted, but also information bits which are overhead required by the protocol in use, such as information bits which identify the destination of the packet, the source of the packet, and synchronization bits. Overhead bits typically appear in a header and trailer to each packet. In addition, acknowledgement packets must be transmitted over the network to confirm receipt of a packet of data. Alternatively, a protocol may include information in the overhead bits in each packet indicating the number of the packet. This information may be used to reassemble the received packets in the correct order, and if a packet is missing, a negative acknowledgement packet may be sent to request retransmission of the missing packet. Otherwise, data loss could occur and not be detected by the system. In any event, acknowledgement packets and other similar handshaking information which must be transmitted over the network according to the protocol impose some limitations upon the data throughput of the network. While this may be acceptable in many instances, in applications where the transfer of huge amounts of data are required, these bandwidth limitations may render such applications impractical in practice.

It is not uncommon for two or more users on a network to attempt to transmit a packet at the same time. When this occurs, it is referred to as a collision. Neither packet will be received successfully, and both must be retransmitted. Obviously, this reduces the throughput of the network. Different protocols employ various schemes to determine the timing of retransmission attempts in an effort to avoid repeated collisions between the same two users.

Data transmission may sometimes experience data errors, where a digital "1" is erroneously received as a "0", or vice versa, due to such events as signal fluctuations or noise. Thus, error correction schemes may be employed in an effort to detect data errors. If an error is detected, then a packet must be retransmitted. Of course, when a packet must be retransmitted, it reduces the overall throughput of the network.

Networking technology has suffered from limitations resulting from a proliferation of non-standard protocols, and limitations due to the nature of the protocols and transmission schemes which are employed. Additional overhead may be imposed when conversion from one protocol to another is required. This additional overhead may effectively limit the overall bandwidth of the network.

Networks may need to be connected by hubs, routers, and other switches. A hub, for example, may have a number of ports, and each port may be connected to a network, such as a LAN or a wide area network. When a packet is received at a hub, the hub switch must determine to which port the packet is to be switched. Alternatively, the packet may be switched to all ports and broadcast over every network connected to the hub. However, if every hub broadcasts every packet on every port, the amount of traffic on the network will be increased and the throughput will invariably suffer. Under heavy traffic, any attempt to determine to which port a packet must be switched must be accomplished speedily to avoid slowing throughput of the network. Therefore, it is desirable to have a method for determining over which port a packet should be transmitted.

In addition to limitations on bandwidth, all of the above discussed factors may affect cost, response time, throughput, delay, maximum transmission rates, and reliability. Many other problems and disadvantages of the prior art will become apparent to one skilled in the art after comparing such prior art with the present invention as described herein.

SUMMARY OF THE INVENTION

Various aspects of the present invention may be realized through a method for reducing latency in conversions from a SMII (Serial Media Independent Interface) to a MII (Media Independent Interface). The method involves generating receive and transmit clock signals from a physical layer device; generating receive and transmit clock signals at a media access controller; and synchronizing the clock signals at the media access controller and the clock signals at the physical layer device such that MII clocks are generated from the SMII and a synchronization signal of the SMII is always delayed 8 nsec from a positive edge of the MII clock.

In some embodiments, the SMII is configured to receive digital information at the same time that the MII receives other digital information. The digital information is commonly a nibble. Of note, the digital information is commonly exchanged during a second part of a frame of the MII.

Other aspects of the present invention are realized in a SMII to MII converter that includes an SMII that sends and receives frames that are configured to transmit data in an SMII standard format and an MII that sends and receives frames that are configured to transmit data in an MII standard format. An MII frame has a first part and a second part where a first nibble is driven to the SMII at the second part of an MII frame. A second nibble is received on the MII frame at the same time the first nibble is being driven to the SMII. The MII has clocks that are generated from the SMII clock and synchronized such that latencies are reduced between conversions from SMII to MII.

In one embodiment, the synchronization signal of the SMII to MII converter is always delayed 8 nsec from a positive edge of the MII clock.

Still other aspects of the present invention are realized through a method for using standard FIFO (First in First Out) techniques and a parallel to serial converter to convert nibble wide data to bit wide data in a data stream. The method involves, not necessarily in this order, transmitting SMII frames such that frames are sent and received that are configured in an SMII standard format; transmitting MII frames such that frames are sent and received that are configured in an MII standard format, the MII frames each having a first part and a second part; driving a first nibble to the SMII at the second part of an MII frame; receiving a second nibble on the MII at the same time the first nibble is being driven to the SMII; generating MII clocks from an SMII clock; and synchronizing the MII clock and the SMII clock such that latencies are reduced between conversions from SMII to MII.

It should be noted that synchronizing the MII clock and the SMII clock may involve consistently delaying a synchronization signal by 8 nsec from a positive edge of the MII clock.

Various aspects of the present invention may also be found in a method for using standard FIFO techniques and a parallel to serial converter to convert nibble wide data to bit wide data in a data stream. The method includes synchronizing clock signals of a MII in a media access controller and other clock signals of a SMII to consistently delay a synchronization signal by 8 nsec from a positive edge of the MII clock.

BRIEF DESCRIPTION OF THE DRAWINGS

A better understanding of the present invention can be obtained when the following detailed description of the drawings is considered in conjunction with the following drawings.

FIG. 3 illustrates a TXSampler stage.

FIG. 4 illustrates a TXOutGenerator stage.

FIG. 5 illustrates a TXFrameGenerator stage.

FIG. 6 illustrates a receive frame assembler.

FIG. 7 illustrates a receive output generator.

FIG. 8 illustrates a receive MII driver.

DETAILED DESCRIPTION OF THE DRAWINGS

Networks that include a PHY layer, such as an Ethernet network, are typically defined to include a Media Independent Interface (MII) that requires 16 pins to carry out data transmission. However, complete MII information may be conveyed between a 10/100 PHY and a MAC using only 2 pins per port when a Serial Media Independent Interface (SMII) is used. The SMII specification was originally developed by Cisco Systems. Use of an SMII interface not only lowers pin count per port, but may also simplify board layout and design. The SMII reduces pin counts per port from 16 to just 2 pins, thereby reducing the packaging costs for both MAC ASICs and transceivers. Pin reduction is accomplished when the devices operate according to the SMII specification. The SMII specification involves operating with one system clock and in both half and full duplex modes. However, the SMII specification introduces latencies in the datapath from the MAC to the wire, especially when the SMII is a bolt-on over an existing MII based MAC or PHY.

The SMII specification reduces the number of pins between a switch/MAC ASIC and a physical layer device. More particularly, transmitted information is communicated with one pin while receive information is communicated with another pin. However, the SMII specification introduces latencies in the data path from the MAC to the transmission media, especially when the SMII is a "bolt-on" over an existing MII-based MAC or PHY. In such instances, the SMII functionality may cause a design to exceed the IEEE-specified signal transmission latency limits.

In a typical implementation, the MII receive clock RXCLK and transmit clock TXCLK are provided to the MAC from the PHY. Accordingly, an SMII to MII converter according to the present invention generates these clocks.

Figure 1:
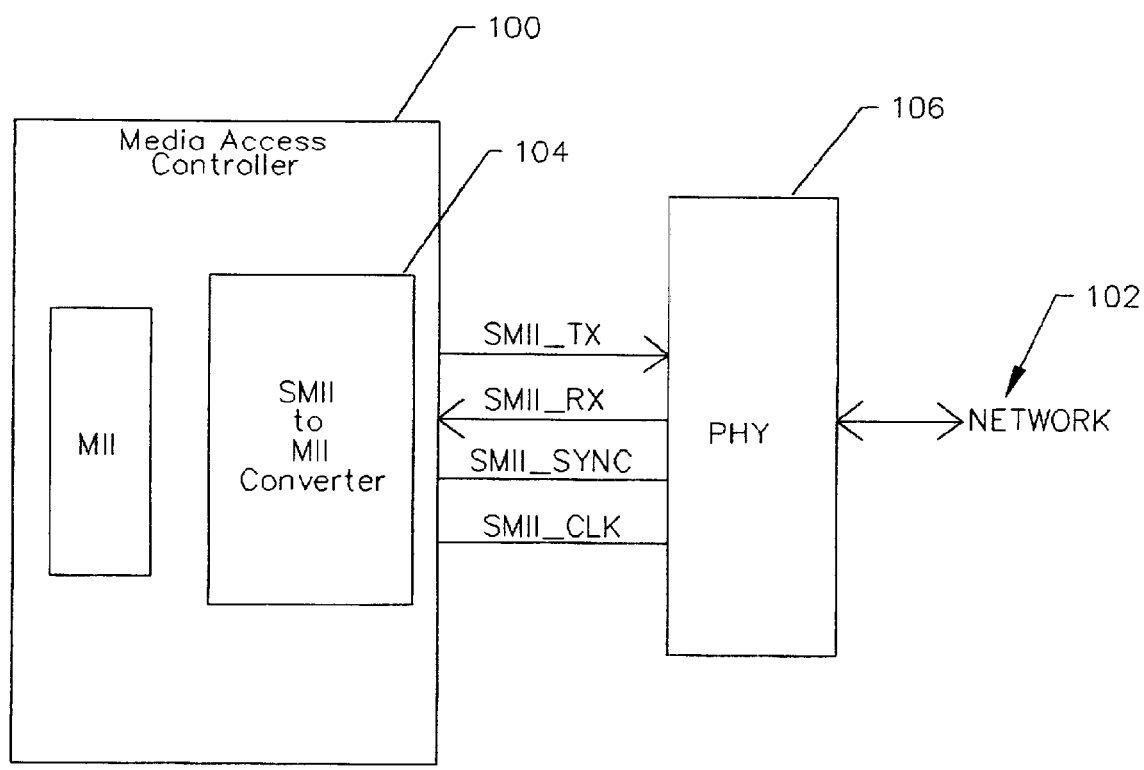
FIG. 1 is a block diagram of an exemplary media access controller (MAC) shown interacting with a network through an SMII to MII converter according to principles of the present invention.

FIG. 1 is a block diagram of an exemplary media access controller (MAC) 100 shown interacting with a network 102 through an SMII to MII converter 104 according to principles of the present invention. Signal transmission between the MAC 100 and a PHY 106 as SMII_TX (transmit), SMII_RX (receive), SMII_SYNC (synchronization), and SMII_CLK (clock) are illustrated to demonstrate the interactions of the devices of a converter that operates according to principles of the present invention.

The converter reduces latencies because it is synchronized to the SMII_SYNC signal so that the clock allows the first nibble to be driven on to the SMII at the second part of the same MII frame in which the second nibble is getting received on the MII. This ensures that the data is transmitted out with the first available sync. MII clocks are generated from the SMII clock and latencies are reduced to 1 to 5 bit times as compared with classical latencies of 8 to 16 bit times. The SMII_SYNC is always delayed by 8 nsec from the positive edge of the MII clock. The SMII frames start at the first available SYNC after an MII transmit signal is asserted.

Figure 2:
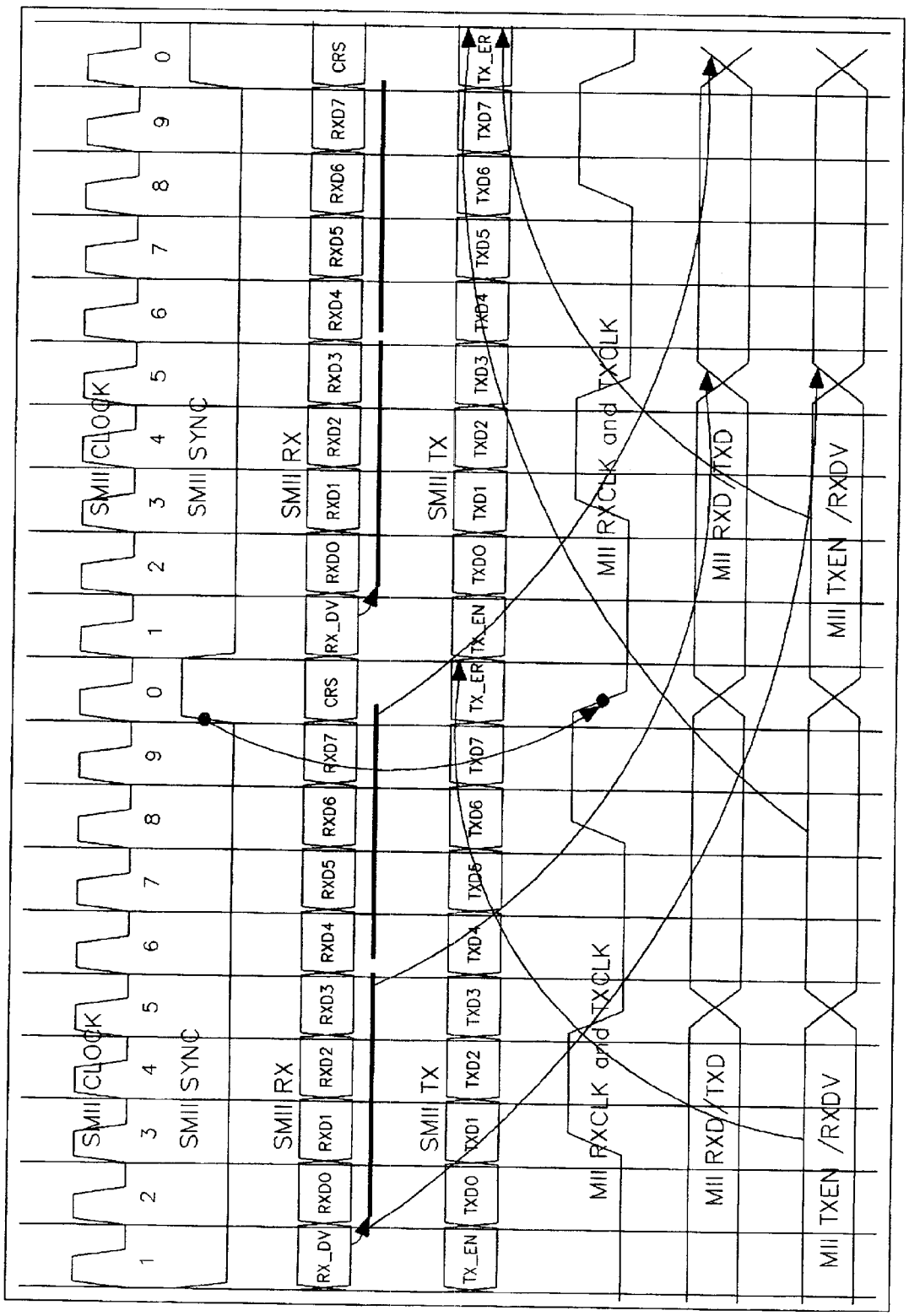
FIG. 2 is an exemplary timing diagram that demonstrates relationships between SMII and MII signals using the device of FIG. 1.

FIG. 2 is an exemplary timing diagram that demonstrates relationships between SMII and MII signals using a device similar to the device of FIG. 1. The MII RXCLK and TXCLK are generated from the PHY and given to the media access controller (MAC). During the start of a transmit frame, the first nibble can be driven on the SMII in the following SMII frame. In this case, the latency is only one SMII frame. However, when the MII TX_EN is found asserted during cycle 8 of an SMII frame and during the start of a transmit frame, the first nibble is sent on the SMII during the following SMII frame only. This is due to the requirement of MII TX_ER bit in the SMII frame. In this case, the latency is about 1.5 SMII frames.

The receive datapath needs to store information for one byte duration so that information is available from the first status frame following the data frames while still holding the last nibble to be received on the MII. Prior to transmission of the last nibble on MII, appropriate action may be taken if certain information is detected. These operations may be performed in either 100BaseX mode or 10BaseX mode. However, 10BaseX mode is different because the transmit on SMII starts after sampling two nibbles on MII, since the MII txclk runs at 2.5 MHz. In addition, in the receive SMII frame, sampling is carried out at the last of the repeated frames, i.e., every SMII frame is repeated ten times to cope with the reduced data rate. This is done so that the last byte of the packet on MII may be sent and sampled to take appropriate action.

These procedures result in the fastest MII to SMII conversion module that can be used with existing MACs and still meet overall bit budgets. This amounts to one synchronization every two MII clock cycles when a sync occurs every ten clocks at a 125 MHz rate.

Appendix A includes sample code of an embodiment according to principles of the present invention of the SMII to MII conversions. A converter may also find use in Reduced Media Independent Interface (RMII) products. The clock divider circuitry of the SMII to MII converter is synchronized to the SMII synchronization signal (SYNC) in order to reduce transmit signal latencies.

Figure 3:
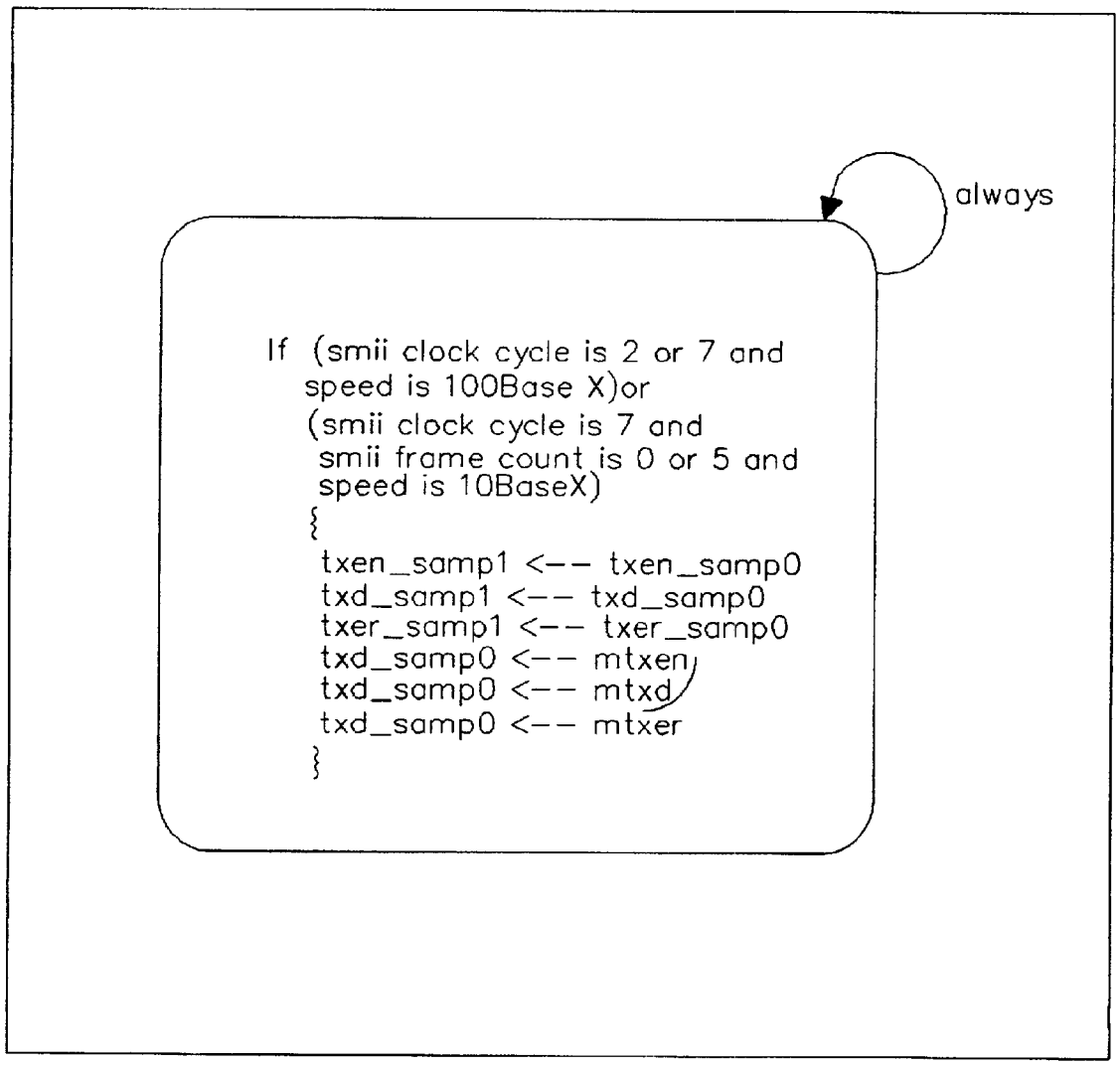
FIGS. 3–5 illustrate state diagrams showing operation of an SMII transmit data path according to principles of the present invention.
Figure 4:
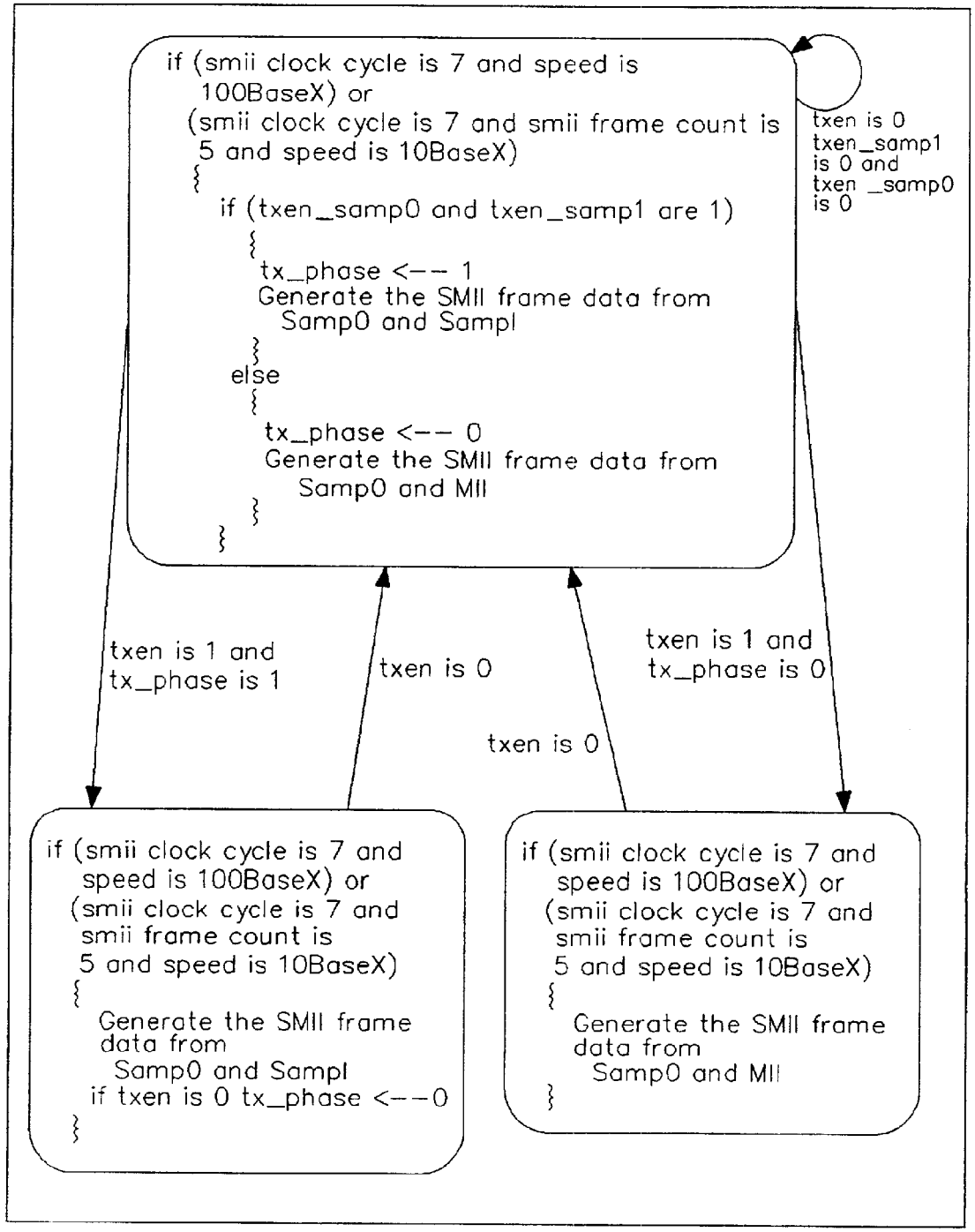
Figure 5:
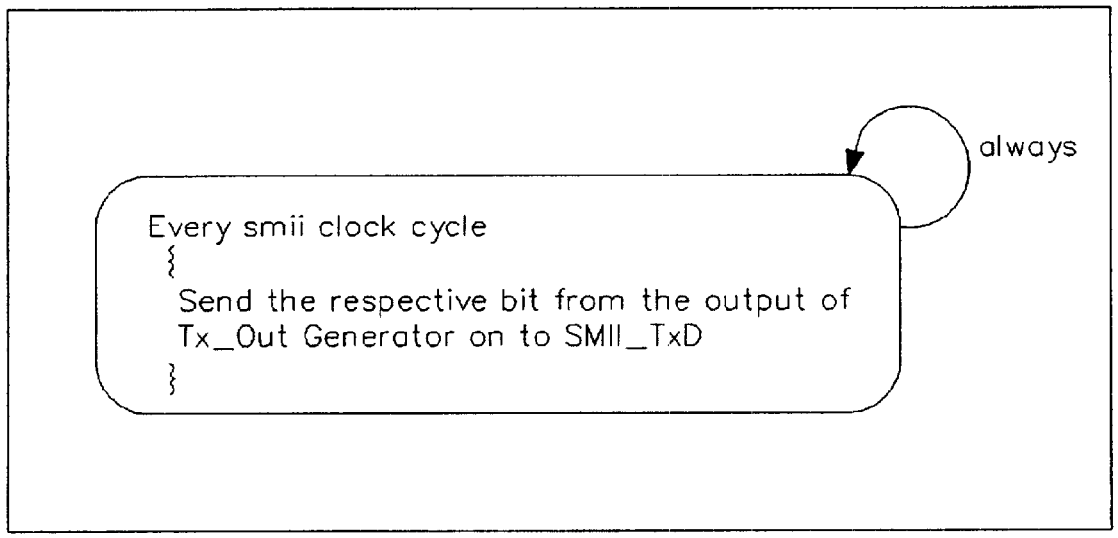

FIGS. 3–5 illustrate state diagrams showing operation of an SMII transmit data path according to principles of the present invention. FIG. 3 illustrates a first stage of logic sample that the MII transmit signals on every clock cycle in which the positive edge of the MII TXCLK is generated. This sampling stage can store the data for two MII clock cycles, i.e., one byte of data. This first stage is sometimes referred to as the TXSampler stage.

FIG. 4 illustrates second stage logic which is enabled only during clock cycle 7 of the SMII frame. This allows for preparation of the SMII Transmit frame data that is going to be sent out in the following SMII TX Frame. Depending on how the MII tx_en is asserted, this second stage sends the byte already sampled by the first stage or the nibble sampled by the first stage in the earlier MII clock, along with the nibble currently getting sampled in MII in this cycle to the following SMII TX Frame. This stage is often referred to as the TXOutGenerator stage.

FIG. 5 illustrates a third stage that simply sends out respective bits from the output of the second stage (FIG. 4) on SMII at the respective bit times. This stage is often referred to as the TXFrameGenerator stage.

Figure 6:
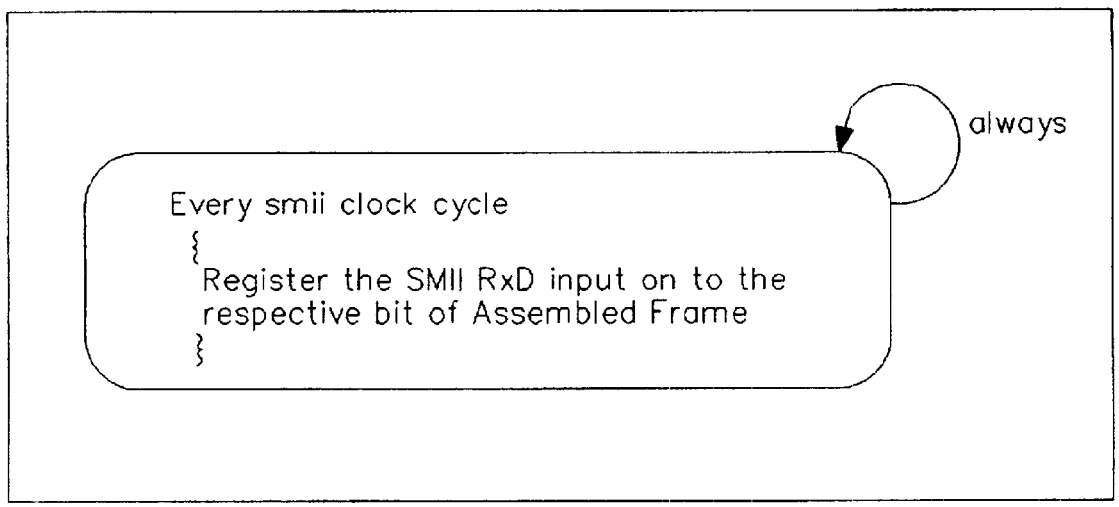
FIGS. 6–8 illustrate state diagrams showing operation of an SMII receive data path according to principles of the present invention.
Figure 7:
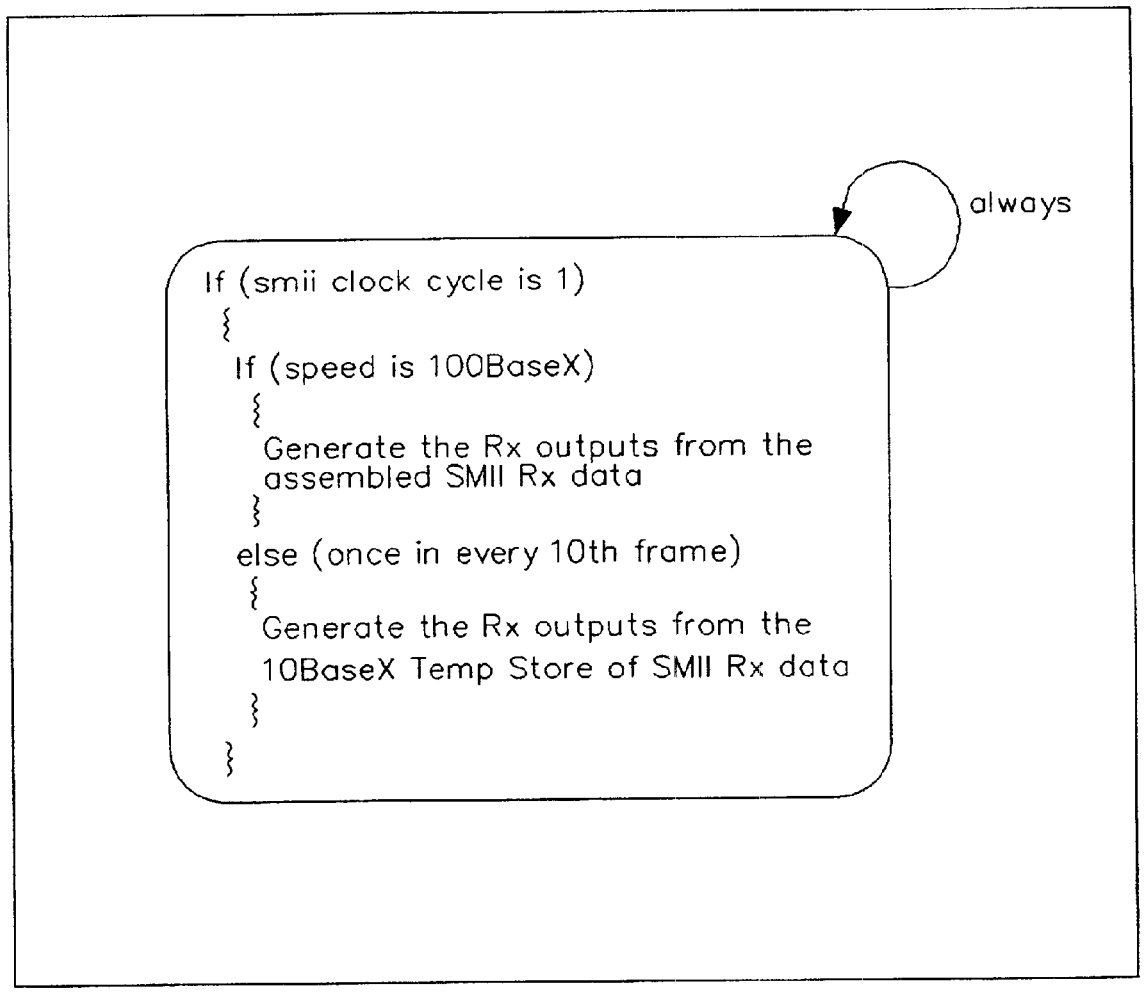
Figure 8:
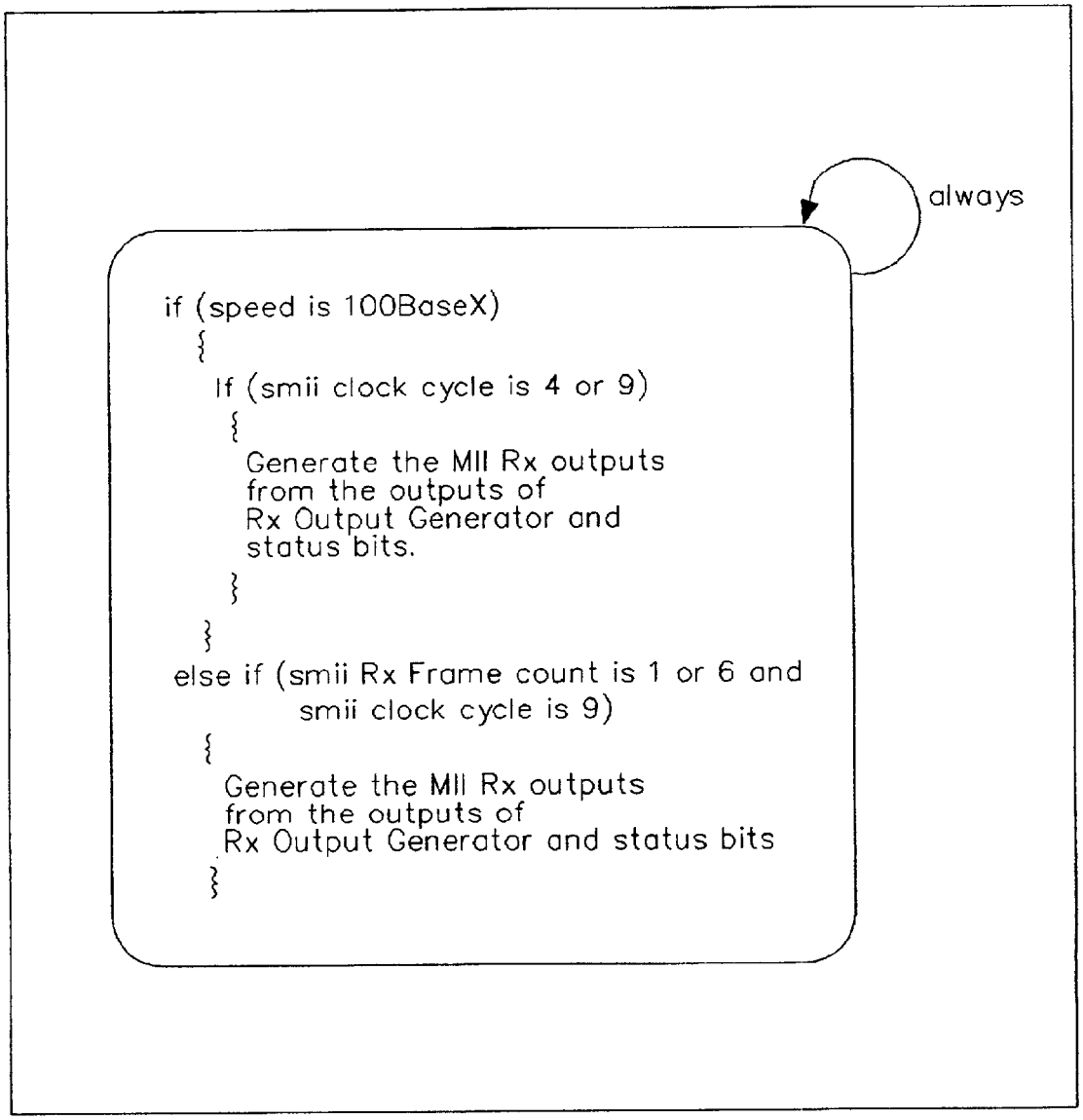

FIGS. 6–8 illustrate state diagrams showing operation of an SMII receive data path according to principles of the present invention. FIG. 6 illustrate the first stage where bits are assembled into frames. This stage is known as the receive frame assembler. The bits have been received on the SMII and in 100BaseX mode, the assembled frame is transferred to a second stage. In 10BaseX mode, the received frames are repeated 10 times to cope with the rate reduction by 10. Since at least one status frame must be sampled before sending out the last byte of a received packet to MII, a modulo 10 counter is run counting the number of frames when RX_DV is asserted. The contents of the receive frame assembler is transferred at the end of every 10th frame to temporary registers prior to being transferred to the second stage.

FIG. 7 illustrates the second stage and is commonly referred to as the receive output generator. As mentioned above, the second stage may receive bits from either a 100BaseX or a 10BaseX system. The information is passed to a third stage when ready.

FIG. 8 illustrates the third stage which is referred to as a receive MII driver. This stage generates the MII receive outputs from the output of the receive output generator of FIG. 7. In 100BaseX mode, MII outputs are generated at cycle 4 and 9 of the SMII frame so that they may be sampled on the positive edge. In 10BaseX mode, the positive edge occurs once in every 5 SMII frames.

The above-listed sections and included information are not exhaustive and are only exemplary for network systems having a PHY with an MII in the corresponding MAC. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

APPENDIX A

```
Code:
//*************************************************************
//*  *
//*  *
//* This file stay not be reproduced, modified, disclosed or *
//* otherwise used without express written permission of *
//* an authorized officer of LSI Logic Corporation. *
//*  *
//* Networking Products Division, LSI Logic Corporation 1999.*
//*  *
//*************************************************************
// ----------------------------------------------------------
// FILENAME : mac_smii.v
//
// DESCRIPTION : MAC side SMII to MII convertor
//
// PROJECT : PHY 110 / Infinity L64324
// ----------------------------------------------------------
// LSI Logic Corp
// Copyright (c) 1995–2000, LSI Logic Corp.
// All Rights Reserved
//----------------------------------------------------------
// This module is the MAC side SMII to MII convertor module
// which converts the SMII interface provided by a PHY
// to MII interface on the MAC
//----------------------------------------------------------
timescale 1ns/10ps
module mac_smii (
//-------------
// Outputs.
//-------------
//----------
// SMII
//----------
smii_txd, // SMII Transmit Data
//----------
// MII
//----------
mcol, // MII Collision
mcrs, // MII Carrier Sense
mrxdv, // Receive Data Valid
mrxer, // MII Receive Error
mtxc, // MII Transmit Clock
mrxc, // MII Receive Clock
mrxd, // MII Receive Data Nibble
//------------
// SMII Status
//------------
speed, // Speed Status from SMII
duplex, // Duplex Status from SMII
```

APPENDIX A-continued

```
link, // Link Status from SMII
jabber_smii, // Jabber Status from SMII
//-------------
// Miscellaneous
//-------------
activity, // Activity output for LED
//------------
// Inputs.
//------------
//---------
// SMII
//---------
smii_rxd, // SMII Receive Data
sync, // SMII SYNC
//----------
// MII
//----------
mtxen, // MII Transmit Enable
mtxer, // MII Transmit Error
mtxd, // MII Transmit Data Nibble
//-------------------
// Resets and Clocks
//-------------------
clk125, // 125MHz SMII Reference Clock
resetn // Main Reset ( Active Low ).
);
parameter tQ = 1;.
output smii_txd;
output mtxc;
output mrxc;
output mrxdv;
output [3:0] mrxd;
output mrxer;
output mcol;
output mcrs;
output speed;
output duplex;
output link;
output jabber_smii;
output activity;
input smii_rxd;
input sync;
input mtxer;
input mtxen;
input [3:0] mtxd;
input clk125;
input resetn;
reg smii_txd;
reg smii_pre_txd;
reg smii_pre_rxd;
reg sync_pre;
reg [2:0] clk25_cnt;
reg [3:0] clk12_5_cnt;
reg clk1_25;
reg miiclk;
reg txen_samp_0;
reg txen_samp_1;
reg txer_samp_0;
reg txar_samp_1;
reg [3:0] txd_samp_0;
reg [3:0] txd_samp_1;
reg txer_out;
reg txen_out;
reg [7:0] txd_byte_out;
reg tx_phase;
wire clk12_5;
wire mtxc;
wire mrxc;
reg [9:0] rx_frame_data;
reg rxdv_out;
reg [7:0] rxd_out;
reg rxdv10_store;
reg [7:0] rxd10_store;
reg [3:0] rx10_frame_cnt;
reg rxer_store;
reg up_nib_val_store;
reg speed;
reg duplex;
reg link;
```

APPENDIX A-continued

```
reg jabber;
reg mrxdv;
reg mrxer;
reg [3:0] mrxd;
wire mcol;
wire mcrs;
wire jabber_smii;
//----------------------------------------
// Clocks Generation Start.
//----------------------------------------
assign mtxc = miiclk;
assign mrxc = miiclk;
// synopsys async_set_reset "resetn"
always @ ( posedge clk125 or negedge resetn )
begin
if ( resetn == 1'b0 )
begin
sync_pre <= #(tQ) 1'b0;
end
else.
begin
sync_pre <= #(tQ) sync;
end
end
always @ ( posedge clk125 or negedge resetn )
begin
if ( resetn == 1'b0 )
begin
clk25_cnt <= #(tQ) 3'h0;
clk1_25 <= #(tQ) 1'b0;
miiclk <= #(tQ) 1'b0;
end
else
begin
if ( speed )
begin
//
c1k1_25 <= #(tQ) 1'b0;
//
miiclk <= #(tQ) ~(clk25_cnt[2] | clk25_cnt[1]);
//
if ( ( sync_pre == 1'b1 ) ||
( clk25_cnt[2] == 1'b1 ) )
clk25_cnt <= #(tQ) 3'h0;
else
clk25_cnt <= #(tQ) clk25_cnt + 1'b1;
end
else if ( clk12_5 == 1'b1 )
begin
//
miiclk <= #(tQ) ~(clk25_cnt[2] | clk25_cnt[1]);
//
if ( clk25_cnt[2] == 1'b1 )
begin
clk1_25 <= #(tQ) ~clk1_25;
clk25_cnt <= #(tQ) 3'h0;
end
else
begin
clk25_cnt <= #(tQ) clk25_cnt + 1'b1;
end
end
end
end
assign clk12_5 = ( clk12_5_cnt[2:0] == 3'h6 );
always @ ( posedge clk125 or negedge resetn )
begin
if ( resetn == 1'b0 )
begin
clk12_5_cnt <= #(tQ) 4'h0;
end
else
begin
if ( sync_pre == 1'b1 )
clk12_5_cnt <= #(tQ) 4'h1;
else if ( clk12_5_cnt == 4'h9 )
clk12_5_cnt <= #(tQ) 4'h0;
else
clk12_5_cnt <= #(tQ) clk12_5_cnt + 1'b1;
```

APPENDIX A-continued

```
end
end
//----------------------------------------
// Clocks Generation End.
//----------------------------------------
//----------------------------------------
// SMII Transmit Start.
//----------------------------------------
//----------------------------------------
// Following samples the MII TX data. (Tx_Sampler)
//----------------------------------------
always @ ( posedge clk125 or negedge resetn )
begin
if ( resetn == 1'b0 )
begin
txen_samp_0 <= #(tQ) 1'b0;.
txen_samp_1 <= #(tQ) 1'b0;
txer_samp_0 <= #(tQ) 1'b0;
txer_samp_1 <= #(tQ) 1'b0;
txd_samp_0 <= #(tQ) 4'h0;
txd_samp_1 <= #(tQ) 4'h0;
end
else
begin
if ( ( ( speed == 1'b1 ) ||
( ( speed == 1'b0 ) &&
( clk12_5 == 1'b1 ) ) )
begin
if ( ~|clk25_cnt )
begin
{txen_samp_1, txen_samp_0} <= #(tQ) {txen_samp_0, mtxen);
{txer_samp_1, txer_samp_0} <= #(tQ) {txer_samp_0, (mtxer & speed)};
{txd_samp_1, txd_samp_0} <= #(tQ) {txd_samp_0, ({4{mtxen}} & mtxd)};
end
end
end
end
//----------------------------------------
// Following generates the TX output data
// from the MII sampled TX data. (TX_Out Generator)
//----------------------------------------
always @ ( posedge clk125 or negedge resetn )
begin
if ( resetn == 1'b0 )
begin
txer_out <= #(tQ) 1'b0;
txen_out <= #(tQ) 1'b0;
txd_byte_out <= #(tQ) 8'h0;
tx_phase <= #(tQ) 1'b0;
end
else
begin
if ( ( clk12_5 == 1'b1 ) &&
( ( clk25_cnt[1] == 1'b0 ) && ( clk25_cnt[0] == 1'b0 ) ) &&
( ( speed == 1'b1 ) ||
( ( speed == 1'b0 ) && ( clk1_25 == 1'b0 ) && ( clk25_cnt[2] == 1'b0 ) ) ) )
begin
//------------------------------------------------------
if ( txen_out == 1'b0 )
begin
if ( ( txen_samp_1 == 1'b1 ) &&
( txen_samp_0 == 1'b1 ) )
begin
tx_phase <= #(tQ) 1'b1;
end
else
begin
tx_phase <= #(tQ) 1'b0;
end
end
//------------------------------------------------------
if ( txen_out == 1'b0 )
begin
if ( ( txen_samp_1 == 1'b1 ) &&
( txen_samp_0 == 1'b1 ) )
begin
txer_out <= #(tQ) (txer_samp_1 | txer_samp_0);
txen_out <= #(tQ) 1'b1;
txd_byte_out <= #(tQ) {txd_samp_0, txd_samp_1};
```

APPENDIX A-continued

```
end
else if ( txen_samp_0 == 1'b1 )
begin
txer_out <= #(tQ) ( txer_samp_0 | (mtxen & mtxer & speed) );
txen_out <= #(tQ) 1'b1;
txd_byte_out <= #(tQ) {mtxd,txd_samp_0};
end
else
begin
txer_out <= #(tQ) 1'b0;
txen_out <= #(tQ) 1'b0;
txd_byte_out <= #(tQ) 8'h0;
end
end
else
begin
if ( tx_phase == 1'b1 ).
begin
txer_out <= #(tQ) ( txen_samp_1 &
(txer_samp_1 | txer_samp_0) );
txen_out <= #(tQ) txen_samp_1;
txd_byte_out <= #(tQ) ({8{txen_samp_1}} & {txd_samp_0,txd_samp_1});
end
else
begin
txer_out <= #(tQ) ( txen_samp_0 &
( txer_samp_0 | (mtxen & mtxer & speed) ) );
txen_out <= #(tQ) txen_samp_0;
txd_byte_out <= #(tQ) ({8{txen_samp_0}} & {({4{mtxen}} & mtxd),txd_samp_0});
end
end
//----------------------------------------------------
end
end
end
//---------------------------------------
// Following creates the SMII TX Frame by
// sequencing the respective bits. (TX Frame Generator)
//---------------------------------------
always @ ( posedge clk125 or negedge resetn )
begin
if ( resetn == 1'b0 )
begin
smii_pre_txd <= #(tQ) 1'b0;
end
else
begin
case ( clk12_5_cnt )
4'h7: // TxER sent here
begin
smii_pre_txd <= #(tQ) txer_out;
end
4'h8: // TxEN sent here
begin
smii_pre_txd <= #(tQ) txen_out;
end
4'h9: // TxD0 sent here
begin
smii_pre_txd <= #(tQ) txd_byte_out[0];
end
4'h0: // TxD1 sent here
begin
smii_pre_txd <= #(tQ) txd_byte_out[1];
end
4'h1: // TxD2 sent here
begin
smii_pre_txd <= #(tQ) txd_byte_out[2];
end
4'h2: // TxD3 sent here
begin
smii_pre_txd <= #(tQ) txd_byte_out[3];
end
4'h3: // TxD4 sent here
begin
smii_pre_txd <= #(tQ) txd_byte_out[4];
end
4'h4: // TxD5 sent here
begin
smii_pre_txd <= #(tQ) txd_byte_out[5];
```

APPENDIX A-continued

```
end
4'h5: // TxD6 sent here
begin
smii_pre_txd <= #(tQ) txd_byte_out[6];
end
4'h6: // TxD7 sent here
begin
smii_pre_txd <= #(tQ) txd_byte_out[7];
end
default:
begin
smii_pre_txd <= #(tQ) 1'b0;
end
endcase
end
end
//----------------------------------------
// Following is the delivery flip-flop for
// SMII TX.
//----------------------------------------
always @ ( posedge clk125 or negedge resetn )
begin
if ( resetn == 1'b0 )
begin
smii_txd <= #(tQ) 1'b0;
end
else
begin
smii_txd <= #(tQ) smii_pre_txd;
end
end
//----------------------------------------
// SMII Transmit End.
//----------------------------------------
//----------------------------------------
// SMII Receive Start.
//----------------------------------------
//----------------------------------------
// First stage receive flip-flop Registers
// SMII RX directly.
//----------------------------------------
always @ ( posedge clk125 or negedge resetn )
begin
if ( resetn == 1'b0 )
begin
smii_pre_rxd <= #(tQ) 1'b0;
end
else
begin
smii_pre_rxd <= #(tQ) smii_rxd;
end
end
//----------------------------------------
// Following registers the RX frame
// depending on the bit in the frame (Rx Frame Assembler)
//----------------------------------------
always @ ( posedge clk125 or negedge resetn )
begin
if ( resetn == 1'b0
begin
rx_frame_data <= #(tQ) 10'h0;
end
else
begin
case ( clk12_5_cnt )
4'h0: // CRS received here
begin
rx_frame_data[0] <= #(tQ) smii_pre_rxd;
end
4'h1: // RX_DV received here
begin
rx_frame_data[1] <= #(tQ) smii_pre_rxd;
end
4'h2: // RxD0/RX_ER received here
begin
rx_frame_data[2] <= #(tQ) smii_pre_rxd;
end
4'h3: // RxD1/Speed received here
begin
```

APPENDIX A-continued

```
rx_frame_data[3] <= #(tQ) smii_pre_rxd;
end
4'h4: // RxD2/Duplex received here
begin
rx_frame_data [4] <= #(tQ) smii_pre_rxd;
end
4'h5: // RxD3/Link received here
begin
rx_frame_data[5] <= #(tQ) smii_pre_rxd;
end
4'h6: // RxD4/Jabber received here
begin
rx_frame_data[6] <= #(tQ) smii_pre_rxd;
end
4'h7: // RxD5/Upp_nib_val received here.
begin
rx_frame_data [7] <= #(tQ) smii_pre_rxd;
end
4'h8: // RxD6/Fls_car received here
begin
rx_frame_data[8] <= #(tQ) smii_pre_rxd;
end
4'h9: // RxD7 received here
begin
rx_frame_data]9] <= #(tQ) smii_pre_rxd;
end
default:
begin
rx_frame_data <= #(tQ) 10'h0;
end
endcase
end
end
//----------------------------------------
// Following counts 10BaseX Frames when rxdv
// is asserted. (Rx Frame counter for 10Basex)
//----------------------------------------
always @ ( posedge clk125 or negedge resetn
begin
if ( resetn == 1'b0 )
begin
rx10_frame_cnt <= #(tQ) 4'h0;
end
else
begin
//
if ( speed == 1'b0 )
begin
if ( clk12_5_cnt == 4'h0 )
begin
if ( ( rx_frame_data[1] == 1'b1 ) ||
( rxdv10_store == 1'b1 ) )
begin
if ( rx10_frame_cnt == 4'h9 )
rx10_frame_cnt <= #(tQ) 4'h0;
else
rx10_frame_cnt <= #(tQ) rx10_frame_cnt + 1'b1;
end
else
begin
rx10_frame_cnt <= #(tQ) 4'h0;
end
end
else
begin
rx10_frame_cnt <= #(tQ) 4'h0;
end
//
end
end
//----------------------------------------
// Following stores the rxdv and rxd[7:0]
// in 10BaseX mode when the frame count
// is 9 ( last of the 10 repeated frames ) . ( Rx Temp Store for 10BaseX )
//----------------------------------------
always @ ( posedge clk125 or negedge resetn
begin
if ( resetn == 1'b0 )
```

APPENDIX A-continued

```
begin
rxdv10_store <= #(tQ) 1'b0;
rxd10_store <= #(tQ) 8'h0;
end
else
begin
//
if ( ( speed == 1'b0 ) && ( rx10_frame_cnt == 4'h9 ) && ( clk12_5_cnt == 4'h0 ) )
begin
rxdv10_store <= #(tQ) rx_frame_data[1];
rxd10_store <= #(tQ) rx_frame_data[9:2];
end
//
end
end.
//----------------------------------------
// Following generates the rxdv_out and
// rxd_out[7:0] synchronous to the generated
// MII RX clock. (Rx Output Generator)
//----------------------------------------
always @ ( posedge clk125 or negedge resetn )
begin
if ( resetn == 1'b0 )
begin
rxdv_out <= #(tQ) 1'b0;
rxd_out <= #(tQ) 8'h0;
end
else
begin
//
if ( clk12_5_cnt == 4'h0 )
begin
if ( speed == 1'b1 )
begin
rxdv_out <= #(tQ) rx_frame_data[1];
rxd_out <= #(tQ) rx_frame_data[9:2];
end
ease if ( {clk1_25,clk25_cnt} == 4'h0 )
begin
rxdv_out <= #(tQ) rxdv10_store;
rxd_out <= #(tQ) rxd10_store;
end
end
//
end
end
//----------------------------------------
// Following registers the status bits from
// the SMII Rx frame. ( Rx Status Register )
//----------------------------------------
always @ ( posedge clk125 or negedge resetn )
begin
if ( resetn == 1'b0 )
begin
speed <= #(tQ) 1'b0;
duplex <= #(tQ) 1'b0;
link <= #(tQ) 1'b0;
jabber <= #(tQ) 1'b0;
rxer_store <= #(tQ) 1'b0;
up_nib_val_store <= #(tQ) 1'b1;
end
else
begin
//
if ( clk12_5_cnt == 4'h0
begin
//
if ( rx_frame_data[1] == 1'b0 )
begin
speed <= #(tQ) rx_frame_data[3];
duplex <= #(tQ) rx_frame_data[4];
link <= #(tQ) rx_frame_data[5];
jabber <= #(tQ) rx_frame_data[6];
end
//
if ( rx_frame_data[1] == 1'b0 )
begin
if ( ( speed == 1'b1 ) ||
( ( speed == 1'b0 ) && ( {clk1_25,clk25_cnt} == 4'h0 ) ) )
```

APPENDIX A-continued

```
begin
rxer_store <= #(tQ) rx_frame_data[2];
up_nib_val_store <= #(tQ) rx_frame_data[7];
end
end
else
begin
rxer_store <= #(tQ) 1'b0;
up_nib_val_store <= #(tQ) 1'b1;
end
end
//
end
end.
//----------------------------------------
// Following generates the MII mrxdv mrxer
// and mrxd. ( Rx MII driver )
//----------------------------------------
always @ ( posedge clk125 or negedge resetn )
begin
if ( resetn == 1'b0 )
begin
mrxdv <= #(tQ) 1'b0;
mrxer <= #(tQ) 1'b0;
mrxd <= #(tQ) 4'h0;
end
else
begin
if ( speed == 1'b1 ) // 100BaseX
begin
if ( clk12_5_cnt == 4'h3 ) // Lower Nibble phase
begin
mrxdv <= #(tQ) rxdv_out;
mrxer <= #(tQ) (rxdv_out) ? ( -rx_frame_data[1] & rx_frame_data[2] ) : // Rx Error.
rxd_out[6]; // False Carrier.
mrxd <= #(tQ) (rxdv_out) ? rxd_out[3:0] : (rxd_out[6]) ? 4'he : 4'h0;
end
else if ( clk12_5_cnt == 4'h8 ) // Upper Nibble phase
begin
if ( mrxdv == 1'b0 )
begin
mrxdv <= #(tQ) 1'b0;
mrxer <= #(tQ) ( ~rxdv_out & rxd_out[6] ); // False Carrier.
mrxd <= #(tQ) (rxd_out[6]) ? 4'he : 4'h0;
end
else
begin
mrxdv <= #(tQ) rx_frame_data[1] | // Frame continues..
( ~rx_frame_data[1] & rx_frame_data[7] ); // Or Upper Nibble Valid.
mrxer <= #(tQ) ( ~rx_frame_data[1] & // Frame End and
rx_frame_data[7] & // Upper nibble valid and
rx_frame_data[2] ); // Rx Error.
mrxd <= #(tQ) rxd_out[7:4];
end
end
end
else // 10BaseX
begin
if ( ( clk12_5_cnt == 4'h8 ) &&
( {clk1_25,clk25_cnt} == 4'h2 ) ) // Lower Nibble phase
begin
mrxdv <= #(tQ) rxdv_out;
mrxer <= #(tQ) (rxdv_out) ? rxer_store : 1'b0;
mrxd <= #(tQ) (rxdv_out) ? rxd_out[3:0] : 4'h0;
end
else if ( ( clk12_5_cnt == 4'h8 ) &&
( {clk1_25,clk25_cnt} == 4'ha ) ) // Upper Nibble phase
begin
if ( mrxdv == 1'b0 )
begin
mrxdv <= #(tQ) 1'b0;
mrxer <= #(tQ) 1'b0;
mrxd <= #(tQ) 4'h0;
end
else
begin
mrxdv <= #(tQ) up_nib_val_store;
mrxer <= #(tQ) up_nib_val_store & rxer_store;
mrxd <= #(tQ) rxd_out[7:4];
```

APPENDIX A-continued

```
end
end
end
end
end
assign mcol = (duplex) ? 1'b0 : (rx_frame_data[0] & mtxen) | jabber_smii;
assign mcrs = (duplex) ? rx_frame_data[0] : (rx_frame_data[0] | txen_samp_1 | txen_samp_0) ;
assign jabber_smii = jabber;
assign activity = (mtxen | mrxdv);
        endmodule
```

What is claimed is:

1. A method for reducing latency in conversions from a Serial Media Independent Interface (SMII) to a Media Independent Interface (MII), comprising:

generating receive and transmit clock signals from a physical layer device;

generating receive and transmit clock signals at a media access controller;

synchronizing the clock signals at the media access controller and the clock signals at the physical layer device such that MII clocks are generated from the SMII and a synchronization signal of the SMII is always delayed 8 nsec from a positive edge of the MII clock.

2. The method of claim 1 wherein the SMII is configured to receive digital information at the same time that the MII receives other digital information.

3. The method of claim 2 wherein the digital information is a nibble.

4. The method of claim 2 wherein the digital information is exchanged during a second part of a frame of the MII.

5. A SMII (Serial Media Independent Interface) to MII (Media Independent Interface) converter comprising:

an SMII that sends and receives frames that are configured to transmit data in an SMII standard format;

an MII that sends and receives frames that are configured to transmit data in an MII standard format;

an MII frame having a first part and a second part;

a first nibble being driven to the SMII at the second part of an MII frame;

a second nibble being received on the MII frame at the same time the first nibble is being driven to the SMII;

the MII having clocks that are generated from the SMII clock and synchronized such that latencies are reduced between conversions from SMII to MII.

6. The SMII to MII converter of claim 5 a synchronization signal of the SMII is always delayed 8 nsec from a positive edge of the MII clock.

7. A method for using standard FIFO techniques and a parallel to serial converter to convert nibble wide data to bit wide data in a data stream, the method comprising:

transmitting SMII frames such that frames are sent and received that are configured in an SMII standard format;

transmitting MII frames such that frames are sent and received that are configured in an MII standard format, the MII frames each having a first part and a second part;

driving a first nibble to the SMII at the second part of an MII frame;

receiving a second nibble on the MII at the same time the first nibble is being driven to the SMII;

generating MII clocks from an SMII clock; and synchronizing the MII clock and the SMII clock such that latencies are reduced between conversions from SMII to MII.

8. The method of claim 7 wherein said synchronizing the MII clock and the SMII clock consistently delays a synchronization signal by 8 nsec from a positive edge of the MII clock.

* * * * *